United States Patent
Aiello et al.

(12)

(10) Patent No.: US 7,023,833 B1
(45) Date of Patent: Apr. 4, 2006

(54) BASEBAND WIRELESS NETWORK FOR ISOCHRONOUS COMMUNICATION

(75) Inventors: Roberto Aiello, Palo Alto, CA (US); Stephan Gehring, Palo Alto, CA (US); William Lynch, Palo Alto, CA (US); Krisnawan K. Rahardja, San Jose, CA (US); Gerald Rogerson, Morgan Hill, CA (US); Carlton J. Sparell, Palo Alto, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 0 days.

(21) Appl. No.: 09/393,126

(22) Filed: Sep. 10, 1999

(51) Int. Cl.
- *A04Q 7/00* (2006.01)
- *H04J 3/00* (2006.01)
- *H04B 7/212* (2006.01)

(52) U.S. Cl. .................. 370/348; 370/329; 370/337

(58) Field of Classification Search ........ 370/321–322, 370/324, 326, 328–330, 336–337, 347–348, 370/350, 437, 442–443, 447, 503, 345, 280, 370/310, 312–314; 455/403, 418, 426, 450, 455/452, 462, 464, 41, 507, 517–518
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | 177/15 |
| 3,728,632 A | 4/1973 | Ross | 328/38 |
| 3,875,524 A | 4/1975 | Harzer et al. | |
| 4,201,892 A | 5/1980 | Schmidt | |
| 4,232,339 A | 11/1980 | Smiley et al. | |
| 4,506,267 A | 3/1985 | Harmuth | |
| 4,574,378 A | 3/1986 | Kobayashi | |
| 4,586,177 A | 4/1986 | Kaul | |
| 4,587,494 A | 5/1986 | Widlar | |
| 4,641,317 A | 2/1987 | Fullerton | 375/1 |
| 4,644,534 A | 2/1987 | Sperlich | |
| 4,651,152 A | 3/1987 | Harmuth | |
| 4,672,608 A | 6/1987 | Ball et al. | |
| 4,743,906 A | 5/1988 | Fullerton | |

(Continued)

FOREIGN PATENT DOCUMENTS

EP 0 307 962 B1 3/1989

(Continued)

OTHER PUBLICATIONS

Fernando Ramirez-Mireles, "On Performance of Ultra Wideband Signals in Gaussian Noise and Dense Multipath," Paper 99C265, Accepted for Publication in the IEEE Transactions on Vehicular Technology, pp. 1-9.

(Continued)

*Primary Examiner*—Chi Pham
*Assistant Examiner*—Ronald Abelson
(74) *Attorney, Agent, or Firm*—Pulse-LINK, Inc; Peter Martinez; Steven Moore

(57) ABSTRACT

A wireless communication network system apparatus which provides for isochronous data transfer between node devices of the network, which provides at least one master node device which manages the data transmission between the other node devices of the network, which avoids or reduces interference from other wireless products and which resolves random errors associated with wireless technology including multipath fading. The system provides a communication protocol which shares the wireless transport medium between the node devices of the network, and which provides each node device on the network a designated transmit time slot for data communication.

76 Claims, 6 Drawing Sheets

U.S. PATENT DOCUMENTS

| | | |
|---|---|---|
| 4,763,325 A | 8/1988 | Wolfe et al. |
| 4,813,057 A | 3/1989 | Fullerton |
| 4,887,266 A | 12/1989 | Neve et al. |
| 4,979,186 A | 12/1990 | Fullerton ..................... 375/23 |
| 5,134,408 A | 7/1992 | Harmuth |
| 5,146,616 A | 9/1992 | Tang et al. ................ 455/103 |
| 5,148,174 A | 9/1992 | Harmuth |
| 5,153,595 A | 10/1992 | Harmuth |
| 5,159,343 A | 10/1992 | Harmuth |
| 5,253,202 A | 10/1993 | Bronner et al. |
| 5,274,271 A | 12/1993 | McEwan |
| 5,307,079 A | 4/1994 | Ross et al. |
| 5,307,081 A | 4/1994 | Harmuth |
| 5,319,218 A | 6/1994 | Kim et al. |
| 5,334,975 A | 8/1994 | Wachob et al. |
| 5,355,374 A | 10/1994 | Hester et al. |
| 5,363,108 A | 11/1994 | Fullerton ..................... 342/27 |
| 5,365,240 A | 11/1994 | Harmuth |
| 5,473,668 A | 12/1995 | Nakahara |
| 5,493,691 A | 2/1996 | Barrett |
| 5,519,400 A | 5/1996 | McEwan |
| 5,523,758 A | 6/1996 | Harmuth |
| 5,537,414 A | 7/1996 | Takiyasu et al. ........... 370/95.1 |
| 5,546,022 A | 8/1996 | D'Souza et al. |
| 5,586,145 A | 12/1996 | Morgan et al. |
| 5,592,177 A | 1/1997 | Barrett |
| 5,594,738 A | 1/1997 | Crisler et al. |
| 5,610,907 A * | 3/1997 | Barrett ....................... 370/342 |
| 5,627,829 A | 5/1997 | Gleeson et al. |
| 5,644,576 A * | 7/1997 | Bauchot et al. ............. 370/337 |
| 5,675,388 A | 10/1997 | Cooper |
| 5,677,927 A | 10/1997 | Fullerton et al. ........... 375/200 |
| 5,687,169 A | 11/1997 | Fullerton ..................... 370/324 |
| 5,687,200 A | 11/1997 | Berger ........................ 375/363 |
| 5,715,236 A | 2/1998 | Gilhousen et al. |
| 5,742,592 A | 4/1998 | Scholefield et al. |
| 5,748,891 A | 5/1998 | Fleming et al. |
| 5,761,197 A | 6/1998 | Takefman |
| 5,790,551 A | 8/1998 | Chan |
| 5,812,671 A | 9/1998 | Ross |
| 5,815,537 A | 9/1998 | Janssen |
| 5,832,035 A | 11/1998 | Fullerton |
| 5,850,422 A | 12/1998 | Chen |
| 5,886,652 A | 3/1999 | Adachi et al. |
| 5,889,767 A | 3/1999 | Kimura |
| 5,901,172 A | 5/1999 | Fontana et al. |
| 5,903,605 A | 5/1999 | Crittenden |
| 5,909,469 A | 6/1999 | Frodigh et al. |
| 5,909,491 A | 6/1999 | Luo |
| 5,920,278 A | 7/1999 | Tyler et al. |
| 5,926,501 A | 7/1999 | Souissi et al. |
| 5,940,435 A | 8/1999 | Hendrickson |
| 5,940,452 A | 8/1999 | Rich |
| 5,952,956 A | 9/1999 | Fullerton |
| 5,953,344 A | 9/1999 | Dail et al. |
| 5,960,000 A | 9/1999 | Ruszczyk et al. |
| 5,970,062 A | 10/1999 | Bauchot |
| 5,977,822 A | 11/1999 | Rybicki et al. |
| 6,002,687 A * | 12/1999 | Magee et al. ................ 370/394 |
| 6,002,708 A | 12/1999 | Fleming et al. |
| 6,014,374 A * | 1/2000 | Paneth et al. ................ 370/345 |
| 6,026,125 A | 2/2000 | Larrick, Jr. et al. |
| 6,031,862 A * | 2/2000 | Fullerton et al. ........... 370/213 |
| 6,041,051 A | 3/2000 | Doshi et al. |
| 6,055,411 A | 4/2000 | Ishida et al. |
| 6,064,697 A | 5/2000 | Yoshikawa |
| 6,067,648 A | 5/2000 | Hunter et al. |
| 6,069,887 A | 5/2000 | Geiger et al. |
| 6,091,717 A | 7/2000 | Honkasalo et al. |
| 6,094,464 A | 7/2000 | Ebringer et al. |
| 6,097,707 A | 8/2000 | Hodzic et al. |
| 6,097,766 A | 8/2000 | Okubo et al. |
| 6,115,390 A | 9/2000 | Chuah |
| 6,122,291 A | 9/2000 | Robinson et al. |
| 6,133,875 A | 10/2000 | Kishimoto |
| 6,133,876 A | 10/2000 | Fullerton et al. |
| 6,161,138 A | 12/2000 | Gross et al. |
| 6,172,965 B1 | 1/2001 | Edwards et al. |
| 6,177,903 B1 * | 1/2001 | Fullerton et al. ............. 342/28 |
| 6,178,217 B1 | 1/2001 | Defries et al. .............. 375/377 |
| 6,181,687 B1 | 1/2001 | Bisdikian |
| 6,212,230 B1 | 4/2001 | Rybicki et al. |
| 6,226,277 B1 | 5/2001 | Nitta et al. |
| 6,232,910 B1 | 5/2001 | Bell et al. |
| 6,236,662 B1 | 5/2001 | Reilly |
| 6,239,741 B1 | 5/2001 | Fontana et al. |
| 6,243,372 B1 | 6/2001 | Petch |
| 6,243,583 B1 | 6/2001 | Tsutsui et al. |
| 6,246,277 B1 | 6/2001 | Nitta et al. |
| 6,246,377 B1 | 6/2001 | Aiello et al. |
| 6,246,702 B1 | 6/2001 | Fellman et al. |
| 6,275,500 B1 * | 8/2001 | Callaway, Jr. et al. ...... 370/449 |
| 6,275,544 B1 | 8/2001 | Aiello et al. |
| 6,278,713 B1 | 8/2001 | Campbell et al. |
| 6,285,662 B1 | 9/2001 | Watanabe et al. |
| 6,285,873 B1 | 9/2001 | Quick, Jr. |
| 6,292,153 B1 | 9/2001 | Aiello et al. |
| 6,300,903 B1 | 10/2001 | Richards et al. |
| 6,310,865 B1 | 10/2001 | Ohki |
| 6,324,397 B1 | 11/2001 | Adachi et al. |
| 6,347,084 B1 | 2/2002 | Hulyalkar et al. |
| 6,351,468 B1 | 2/2002 | LaRowe et al. |
| 6,351,652 B1 | 2/2002 | Finn et al. |
| 6,385,461 B1 * | 5/2002 | Raith ......................... 455/518 |
| 6,400,308 B1 | 6/2002 | Bell et al. |
| 6,424,645 B1 | 7/2002 | Kawabata et al. |
| 6,437,832 B1 | 8/2002 | Grabb et al. |
| 6,449,265 B1 * | 9/2002 | Prieto, Jr. .................... 370/329 |
| 6,463,042 B1 | 10/2002 | Paatelma |
| 6,477,171 B1 | 11/2002 | Wakeley et al. |
| 6,480,505 B1 | 11/2002 | Johansson et al. |
| 6,483,826 B1 * | 11/2002 | .ANG.kerberg ............. 370/335 |
| 6,492,904 B1 | 12/2002 | Richards |
| 6,497,656 B1 | 12/2002 | Evans et al. |
| 6,505,032 B1 | 1/2003 | McCorkle et al. |
| 6,510,150 B1 | 1/2003 | Ngo |
| 6,519,460 B1 * | 2/2003 | Haartsen ..................... 445/452 |
| 6,539,213 B1 | 3/2003 | Richards et al. ......... 455/226.3 |
| 6,549,567 B1 | 4/2003 | Fullerton |
| 6,574,266 B1 * | 6/2003 | Haartsen ..................... 375/133 |
| 6,580,704 B1 * | 6/2003 | Wellig et al. ............... 370/338 |
| 6,597,683 B1 | 7/2003 | Gehring et al. |
| 6,603,818 B1 | 8/2003 | Dress et al. |
| 6,621,857 B1 | 9/2003 | Belotserkovsky et al. |
| 6,625,229 B1 | 9/2003 | Dress et al. |
| 6,628,642 B1 | 9/2003 | Mile'n et al. |
| 6,633,558 B1 | 10/2003 | Cho et al. |
| 6,668,008 B1 | 12/2003 | Panasik |
| 6,697,382 B1 | 2/2004 | Eatherton |
| 6,707,828 B1 | 3/2004 | Wolf |
| 6,735,238 B1 | 5/2004 | McCorkle et al. |
| 6,735,734 B1 | 5/2004 | Liebetreu et al. |
| 6,747,959 B1 | 6/2004 | Ho |
| 6,791,734 B1 | 9/2004 | Izadpanah |
| 2001/0055353 A1 | 12/2001 | Rybicki et al. |
| 2002/0018458 A1 | 2/2002 | Aiello et al. |
| 2002/0080889 A1 | 6/2002 | Dress, Jr. et al. |
| 2002/0131370 A1 | 9/2002 | Chuah et al. |
| 2003/0054764 A1 * | 3/2003 | McCorkle et al. ............ 455/40 |

FOREIGN PATENT DOCUMENTS

| | | |
|---|---|---|
| EP | 0 817 399 A2 | 1/1998 |
| EP | 0 825 794 A2 | 2/1998 |

| | | |
|---|---|---|
| EP | 0 817 399 A3 | 7/1998 |
| EP | 0 825 794 A3 | 1/2000 |
| EP | 0 307 962 A3 | 5/2000 |
| WO | WO 91/07030 A1 | 5/1991 |
| WO | WO 95/23461 A1 | 8/1995 |
| WO | WO 97/21294 A2 | 6/1997 |
| WO | WO 98/27670 A1 | 6/1998 |
| WO | WO 01/93434 A2 | 10/2001 |
| WO | WO 02/31986 A2 | 4/2002 |

OTHER PUBLICATIONS

Fernando Ramirez-Mireles et al., "N-Orthogonal Time-Shift-Modulated Codes for Impulse Radio," Communication Sciences Institute, Department of Electrical Engineering-Systems, University of Southern California, Los Angeles, CA 90089-2565 USA, pp. 1-4.

Henning F. Harmuth, "Fundamental Limits for Radio Signals With Large Bandwith," IEEE Transactions on Electromagnetic Compatibility, vol. EMC-23, No. 1, Feb. 1981, pp. 37-43.

Henning F. Harmuth et al., "Large-Current, Short-Length Radiator for Nonsinusoidal Waves," IEEE International Symposium on Electromagnetic Compatibility, 1983, pp. 453-456.

Henning F. Harmuth, "Frequency-Sharing and Spread-Spectrum Transmission with Large Relative Bandwidth," IEEE Transactions on Electromagnetic Compatibility, vol. EMC-20, No. 1, Feb. 1978, pp. 232-239.

Henning F. Harmuth, "Applications of Walsh functions in communications," IEEE Spectrum, Nov. 1969, pp. 82-91.

Aether Wire & Location, Inc., Robert Fleming et al., Robert Fleming et al., "Integrated, Low-Power, Ultra-Wideband Transceivers for Distributed Position Location and Communication," Technical Abstracts of Proposal to Defense Advanced Research Projects Agency (DARPA), Part I—Technical Proposal, 1998, pp. 1-52.

Aether Wire & Location, Inc., Robert Fleming et al., "Low-Power, Miniature, Distributed Position Location and Communication Devices Using Ultra-Wideband, Nonsinusoidal Communication Technology," Semi-Annual Technical Report Prepared for: ARPA/FBI, Jul. 1995, pp. 1-40.

"IEEE Standards for Local Area Networks: Carrier Sense Multiple Access with Collision Detection", ANSI/IEEE Std. 802.3-1998, The Institute of Electronic and Electrical Engineers, pp. 1-103, 1998.

* cited by examiner

BASEBAND WIRELESS NETWORK FOR ISOCHRONOUS COMMUNICATION

BACKGROUND OF THE INVENTION

1. Field of the Invention

This invention pertains generally to network systems for exchanging data across a shared medium. More particularly, the invention is a wireless communication network system for isochronous data transfer between node devices of the network system that provides at least one master node device which manages the data transmission between slave node devices of the network system, and which further provides a time division multiple access frame definition which provides each node device on the network system a transmit time slot for communication.

2. The Prior Art

Network systems for data communication exchange have been evolving for the past several decades. Particularly, computer network systems have been developed to exchange information and provide resource sharing. Network systems generally comprise one or more node devices which are interconnected and capable of communicating. The most common network systems today are "wired" local area networks (LANs) and wide area networks (WANs). Normally, node devices participating in such wired networks are physically connected to each other by a variety of transmission medium cabling schemes including twisted pair, coaxial cable, fiber optics and telephone systems including time division switches (T-1, T-3), integrated services digital network (ISDN), and asymmetric digital subscriber line (ADSL). While wired solutions provide adequate bandwidth or data throughput between node devices on the network, users participating in such networks are generally restricted from mobility. Typically, users participating in a wired network are physically limited to a specific proximity by the length of the cable attached to the user's node device.

Many common network protocols in use today are asynchronous and packet based. One of the most popular is Ethernet or IEEE 802.3. These types of networks are optimized for bursts of packetized information with dynamic bandwidth requirements settled on-demand. This type of network works well for many data intensive applications in computer networks but is not ideal for situations requiring consistent delivery of time-critical data such as media streams. Media streams typically require connection oriented real-time traffic. Most media stream applications need to establish a required level of service. Dedicated connections are required with a predictable throughput. Low traffic jitter is often a necessity and can be provided with the use of a common network clocking reference.

Firewire, or IEEE 1394, is an emerging wireline network technology that is essentially asynchronous, but provides for isochronous transfers or "sub-actions". Isochronous data is given priority, but consistent time intervals of data transfer is limited by mixing isochronous and purely asynchronous transfers.

Universal Serial Bus (USB) is a popular standard for computer peripheral connections. USB supports isochronous data transfer between a computer and peripheral devices. The computer serves as bus master and keeps the common clock reference. All transfers on USB must either originate or terminate at the bus master, so direct transfers between two peripheral devices is not supported.

Wireless transmission provides mobile users the ability to connect to other network devices without requiring a physical link or wire. Wireless transmission technology provides data communication through the propagation of electromagnetic waves through free space. Various frequency segments of the electromagnetic spectrum are used for such transmission including the radio spectrum, the microwave spectrum, the infrared spectrum and the visible light spectrum. Unlike wired transmission, which is guided and contained within the physical medium of a cable or line, wireless transmission is unguided, and propagates freely though air. Thus the transport medium air in wireless communication is always shared between various other wireless users. As wireless products become more pervasive, the availability of airspace for data communication becomes proportionally more limited.

Radio waves travel long distances and penetrate solid objects and are thus useful for indoor and outdoor communication. Because radio waves travel long distances, radio interference between multiple devices is a common problem, thus multiple access protocols are required among radio devices communicating using a single channel. Another common problem associated with wireless transmission is multi-path fading. Multipath fading is caused by divergence of signals in space. Some waves may be refracted off low-lying atmospheric layers or reflected off objects such as buildings and mountains, or indoors off objects such as walls and furniture and may take slightly longer to arrive than direct waves. The delayed waves may arrive out of phase with the direct waves and thus strongly attenuate or cancel the signal. As a result of multipath fading, operators have resorted to keeping a percentage of their channels idle as spares when multipath fading wipes out some frequency band temporarily.

Infrared communication is widely used for short-range communication. The remote controls used on televisions, VCRs, and stereos all use infrared communication. The major disadvantage to infrared waves is that they do not pass through solid objects, thus limiting communication between devices to "line of sight". These drawbacks associated with the current implementation of wireless technology in network systems have resulted in mediocre performance and periodic disruption of operations.

In addition to the above noted drawbacks of Firewire and USB, there are currently no standards for wireless implementations of either. Of the wireless networks in use today, many are based at least in part on the IEEE 802.11 (wireless ethernet) extension to IEEE 802.3. Like wireless ethernet, this system is random access, using a carrier sense multiple access with collision detect (CSMA-CD) scheme for allowing multiple transmitters to use the same channel. This implementation suffers from the same drawback of wireline ethernet described above.

A similar implementation intended for industrial use is that of Hyperlan™. While still an asynchronous protocol, Hyperlan™ uses priority information to give streaming media packets higher access to the random access channel. This implementation reduces, but does not eliminate the problems of sending streaming media across asynchronous networks.

The Home-RF consortium is currently working on a proposal for a wireless network specification suitable for home networks. The current proposal specifies three types of wireless nodes, the connection points (CP), isochronous devices (I-nodes), and asynchronous devices (A-nodes). Isochronous transfers on the Home-RF network are intended for 64-kbps voice (PSTN) services and are only allowed between I-node devices and the CP device that is connected to the PSTN network. There is no allowance in the Home-RF specification for alternative methods of isochronous communication such as might be required for high quality audio or video.

The Bluetooth Special Interest Group™ has developed a standard for a short range low bit-rate wireless network. This network standard does overcome some of the shortcomings of random access networks, but still lacks some of the flexibility needed for broadband media distribution. The Bluetooth network uses a master device which keeps a common clock for the network. Each of the slave devices synchronizes their local clock to that of the master, keeping the local clock within +/−10 microseconds (μsecs). Data transfer is performed in a Time Division Multiple Access (TDMA) format controlled by the master device. Two types of data links are supported: Synchronous Connection Oriented (SCO) and Asynchronous Connection-Less (ACL). The Master can establish a symmetric SCO link with a slave by assigning slots to that link repeating with some period Tsco. ACL links between the master and slave devices are made available by the Master addressing slave devices in turn and allowing them to respond in the next immediate slot or slots. Broadcast messages are also allowed originating only at the master with no direct response allowed from the slave devices.

Several limitations exist in the Bluetooth scheme. All communication links are established between the master device and the slave devices. There are no allowances for slave—slave communication using either point-to-point or broadcast mechanisms. Additionally, isochronous communications are only allowed using symmetric point-to-point links between the master device and one slave device. The TDMA structure used by Bluetooth is also limiting in that slot lengths are set at N*625 μsecs where N is an integer 0<=1<=5.

All of the above wireless network schemes use some form of continuous wave (CW) communications, typically frequency hopping spread spectrum. The drawbacks of these systems are that they suffer from multipath fading and use expensive components such as high-Q filters, precise local high-frequency oscillators, and power amplifiers.

Win et. al. have proposed using time-hopping spread spectrum multiple access (TH-SSMA), a version of Ultra-Wide Band (UWB), for wireless extension of Asynchronous Transfer Mode (ATM) networks which is described in the article to Win, Moe Z., et. al. entitled "ATM-Based TH-SSMA Network for Multimedia PCS" published in "IEEE Journal on selected areas in communications", Vol. 17, No. 5, May 1999. Their suggestion is to use TH-SSMA as a wireless "last hop" between a wireline ATM network and mobile devices. Each mobile device would have a unique connection to the closest base station. Each mobile-to-base connection would be supplied with a unique time hopping sequence. Transfers would happen asynchronously with each node communicating with the base at any time using a unique hopping sequence without coordinating with other mobile devices.

There are significant drawbacks to the TH-SSMA system for supporting media stream transfers between devices of the network. This method is designed to link an external switched wireline network to mobile nodes, not as a method of implementing a network of interconnected wireless nodes. This method relies on the external ATM network to control the virtual path and virtual connections between devices. Base stations must be able to handle multiple simultaneous connections with mobile devices, each with a different time hopping sequence, adding enormously to the cost and complexity of the base station. Transfers between mobile devices must travel through the base station using store and forward. Finally, all mobile nodes are asynchronous, making truly isochronous transfers impossible.

Accordingly, there is a need for a wireless communication network system apparatus which provides for isochronous data transfer between node devices of the network, which provides at least one master node device which manages the data transmission between the other node devices of the network, and which provides a means for reducing random errors induced by multipath fading, and which further provides communication protocol to provide a means for sharing the transport medium between the node devices of the network so that each node device has a designated transmit time slot for communicating data. The present invention satisfies these needs, as well as others, and generally overcomes the deficiencies found in the background art.

BRIEF DESCRIPTION OF THE INVENTION

The present invention is a wireless communication network system for isochronous data transfer between node devices. In general, the network system comprises a plurality of node devices, wherein each node device is a transceiver. Each transceiver includes a transmitter or other means, for transmitting data to the other transceivers as is known in the art. Each transceiver also includes a receiver or other means for receiving data from the other transceivers as is known in the art. One of the transceivers is preferably structured and configured as a "master" device. Transceivers other than the master device are structured and configured as "slave" devices. The master device carries out the operation of managing the data transmission between the node devices of the network system. The invention further provides means for framing data transmission and means for synchronizing the network.

By way of example, and not of limitation, the data transmission framing means comprises a Medium Access Control protocol which is executed on circuitry or other appropriate hardware as is known in the art within each device on the network. The Medium Access Control protocol provides a Time Division Multiple Access (TDMA) frame definition and a framing control function. The TDMA architecture divides data transmission time into discrete data "frames". Frames are further subdivided into "slots". The framing control function carries out the operation of generating and maintaining the time frame information by delineating each new frame by Start-Of-Frame (SOF) symbols. These SOF symbols are used by each of the slave devices on the network to ascertain the beginning of each frame from the incoming data stream.

In the preferred embodiment, the frame definition comprises a master slot, a command slot, and a plurality of data slots. The master slot is used for controlling the frame by delineating the SOF symbols. As described in further detail below, the master slot is also used for synchronizing the network. The command slot is used for sending, requesting and authorizing commands between the master device and the slave devices of the network. The master device uses the command slot for ascertaining which slave devices are online, offline, or engaged in data transfer. The master device further uses the command slot for authorizing data transmission requests from each of the slave devices. The slave devices use the command slot for requesting data transmission and indicating its startup (online) or shutdown (offline) state. The data slots are used for data transmission between the node devices of the network. Generally, each transmitting device of the network is assigned one or more corresponding data slots within the frame in which the device may transmit data directly to another slave device without the need for a "store and forward" scheme as is presently used in the prior art. Preferably, the master dynamically assigns one or more data slots to slave devices which are requesting to transmit data. Preferably, the data slots are structured and configured to have variable bit lengths having a granularity of one bit. The present invention provides that the master device need not maintain communication hardware to provide simultaneous open links between itself and all the slave devices.

Broadcast is supported with synchronization assured. This guarantees that media can be broadcast to many nodes at the same time. This method allows, for example, synchronized audio data to be sent to several speakers at the same time, and allows left and right data to be sent in the same frame.

Asynchronous communication is allowed in certain slots of the frame through the use of either master polling or CSMA-CD after invitation from the master.

The means for synchronizing the network is preferably provided by a clock master function in the master device and a clock recovery function in the slave devices. Each node device in the network system maintains a clock running at a multiple of the bit rate of transmission. The clock master function in the master device maintains a "master clock" for the network. At least once per frame, the clock master function issues a "master sync code" that is typically a unique bit pattern which identifies the sender as the clock master. The clock recovery function in the slave devices on the network carries out the operation of recovering clock information from the incoming data stream and synchronizing the slave device to the master device using one or more correlators which identifies the master sync code and a phase or delayed locked loop mechanism. In operation, the clock master issues a "master sync code" once per frame in the "master slot". A slave device trying to synchronize with the master clock will scan the incoming data stream for a master sync code using one or more correlators. As each master sync code is received, the phase or delayed locked loop mechanism is used to adjust the phase of the slave clock to that of the incoming data stream. By providing a common network clock on the master device, with slave devices synchronizing their local clocks to that of the master clock, support for synchronous and isochronous communication in additional to asynchronous communication is provided. Time reference between all device nodes is highly accurate eliminating most latency and timing difficulties in isochronous communication links.

As noted above, each transceiver carries out the operation of transmitting and receiving data. In wireless transmission, data is transmitted via electromagnetic waves, which are propagated through free space. In the preferred embodiment, the invention provides data transmission via baseband wireless technology. This method uses short Radio Frequency (RF) pulses to spread the power across a large frequency band and as a consequence reduces the spectral power density and the interference with any device that uses conventional narrowband communication. This method of transmitting short pulses is also referred to as Ultra Wide Band technology. This present implementation provides baseband wireless transmission without any carrier. Use of baseband wireless greatly reduces multipath fading and provides a cheaper, easier to integrate solution by eliminating a sinewave carrier. According to the invention, there is no carrier to add, no carrier to remove, and signal processing may be done in baseband frequencies.

Additionally, using short pulses provides another advantage over Continuous Wave (CW) technology in that multipath fading can be avoided or significantly reduced.

The present invention further provides a modulator or other means for modulating data as is known in the art, a demodulator or other means for demodulating data as is known in the art, and a gain controller or other means for controlling the gain of each of the transceivers. In the preferred embodiment, the means for modulating data comprises a modulator which converts the TDMA frames into streams of baseband pulses. The means for demodulating data comprises a demodulator which converts incoming baseband pulses into TDMA frames.

In a first embodiment, the invention provides pulse modulation and demodulation with on/off keying. The transmitting device modulates a "1" into a pulse. A "0" is indicated as the absence or lack of a pulse. The receiver locks on to the transmitted signal to determine where to sample in the incoming pulse streams. If a pulse appears where the signal is sampled, a "1" is detected. If no pulse appears, a "0" is detected.

In another exemplary embodiment, the invention provides pulse modulation and demodulation using a pulse amplitude modulation scheme. Here, the transmitting device modulates a digital symbol as a pulse amplitude. For example, a three bit symbol can be represented with eight levels of pulse amplitude. The receiver locks on to the transmitted signal to determine where to sample the incoming pulse stream. The level of the pulse stream is sampled, and the pulse amplitude is converted to a digital symbol.

The gain controlling means carries out the operation of adjusting the output gain of the transmitter and adjusting the input gain of the receiver.

The network system also includes a hardware interface within the Data Link Layer of the Open Systems Interconnection (OSI) Reference Model comprising a multiplexer/demultiplexer unit and a plurality of slot allocation units.

The master devices described herein, in addition to carrying out its functions as a master device, may also carry out functions as a slave device as described above. For example, the master device may also engage in data transfer of non-protocol related data with a slave device.

An object of the invention is to provide a baseband wireless network system which overcomes the deficiencies in the prior art.

Another object of the invention is to provide a baseband wireless network system which provides isochronous data communication between at least two node devices on the network.

Another object of the invention is to provide a baseband wireless network system which provides a master device which manages network data communication between the other nodes devices of the network.

Another object of the invention is to provide a baseband wireless network system which provides a time division multiple access frame definition which provides each node device on the network at least one transmit time slot for data communication.

Another object of the invention is to provide a baseband wireless network system which provides a time division multiple access frame definition which provides means for sharing the data communication medium between the node devices on the network.

Another object of the invention is to provide a baseband wireless network system which provides baseband wireless data communication between the node devices of the network.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWING FIGURES

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown FIG. 1 through FIG. 6. It will be appreciated that the apparatus may vary as to configuration and as to details of the parts, and that the method may vary as to details and the order of the steps, without departing from the basic concepts as disclosed herein. The invention is disclosed generally in terms of a wireless network for isochronous data communication, although numerous other uses for the invention will suggest themselves to persons of ordinary skill in the art.

Figure 1:
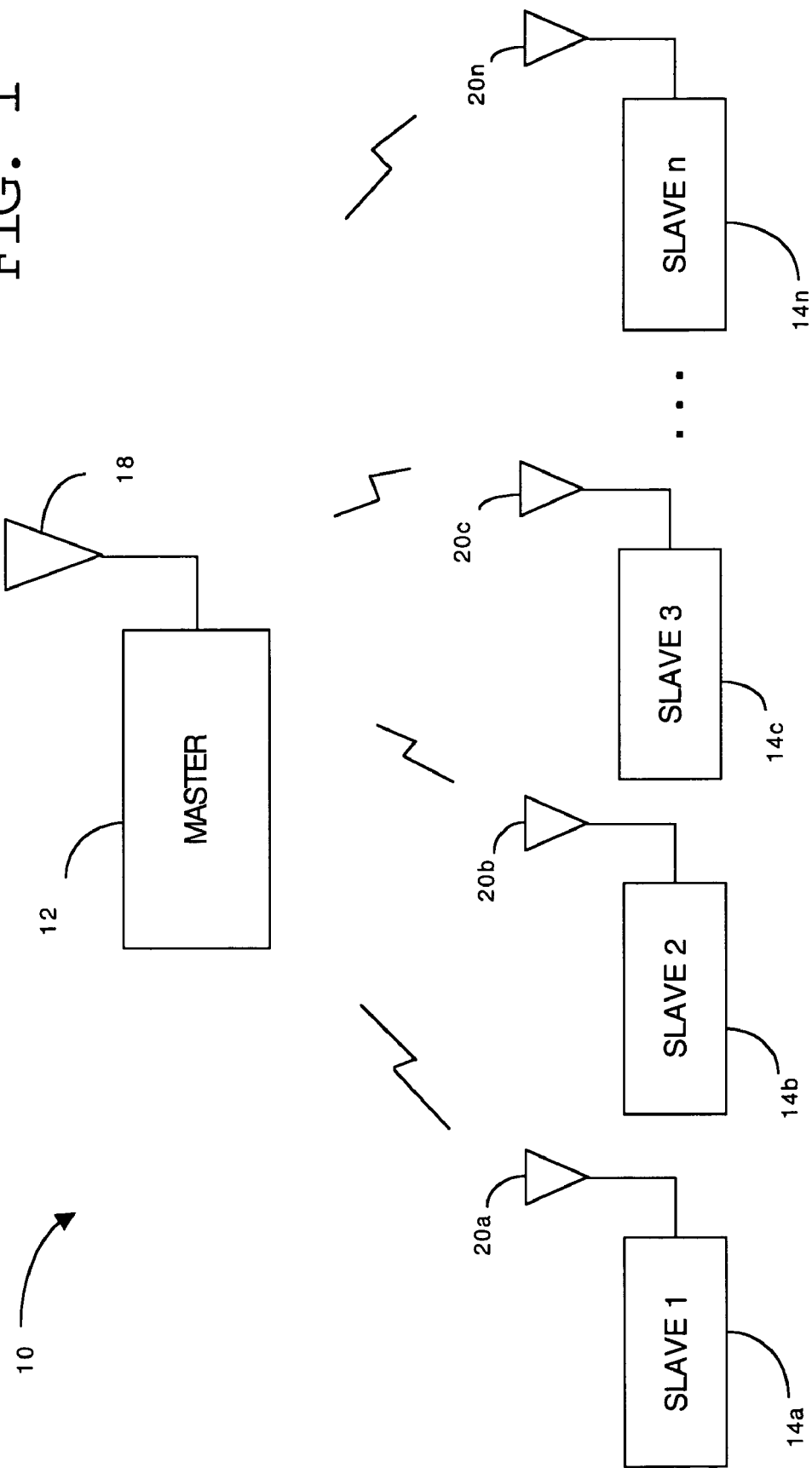
FIG. 1 is a functional block diagram showing a network system in accordance with the invention.

Referring first to FIG. 1, there is shown generally a wireless network system 10 in accordance with the invention. The network system 10 comprises a "master" transceiver device 12 and one or more "slave" transceiver devices 14a through 14n. The master device may also be referred to as a "base" transceiver, and slave devices may also be referred to as "mobile" transceivers. Master transceiver 12 and slave transceivers 14a through 14n include a transmitter or other means for transmitting data to the other transceivers of the network 10 via a corresponding antenna 18, 20a through 20n. Transceivers 12, 14a through 14n further include a receiver or other means for receiving data from the other transceivers via its corresponding antenna 18, 20a through 20n. While the illustrative network 10 shows the transceiver devices 12, 14a through 14n using a corresponding single shared antenna 18, 20a through 20n for both transmission and reception, various arrangements known in the art may be used for providing the functions carried out by the antenna 18, 20a through 20n, including, for example, providing each of the transceiver devices 12, 14a through 14n a first antenna for transmission and a second antenna for reception.

As described further below, the master transceiver 12 carries out the operation of managing network communication between all transceivers 12, 14a through 14n of the network 10. The master transceiver 12 includes means for managing the data transmission between the transceiver nodes of the network 10 as described further below.

Figure 2:
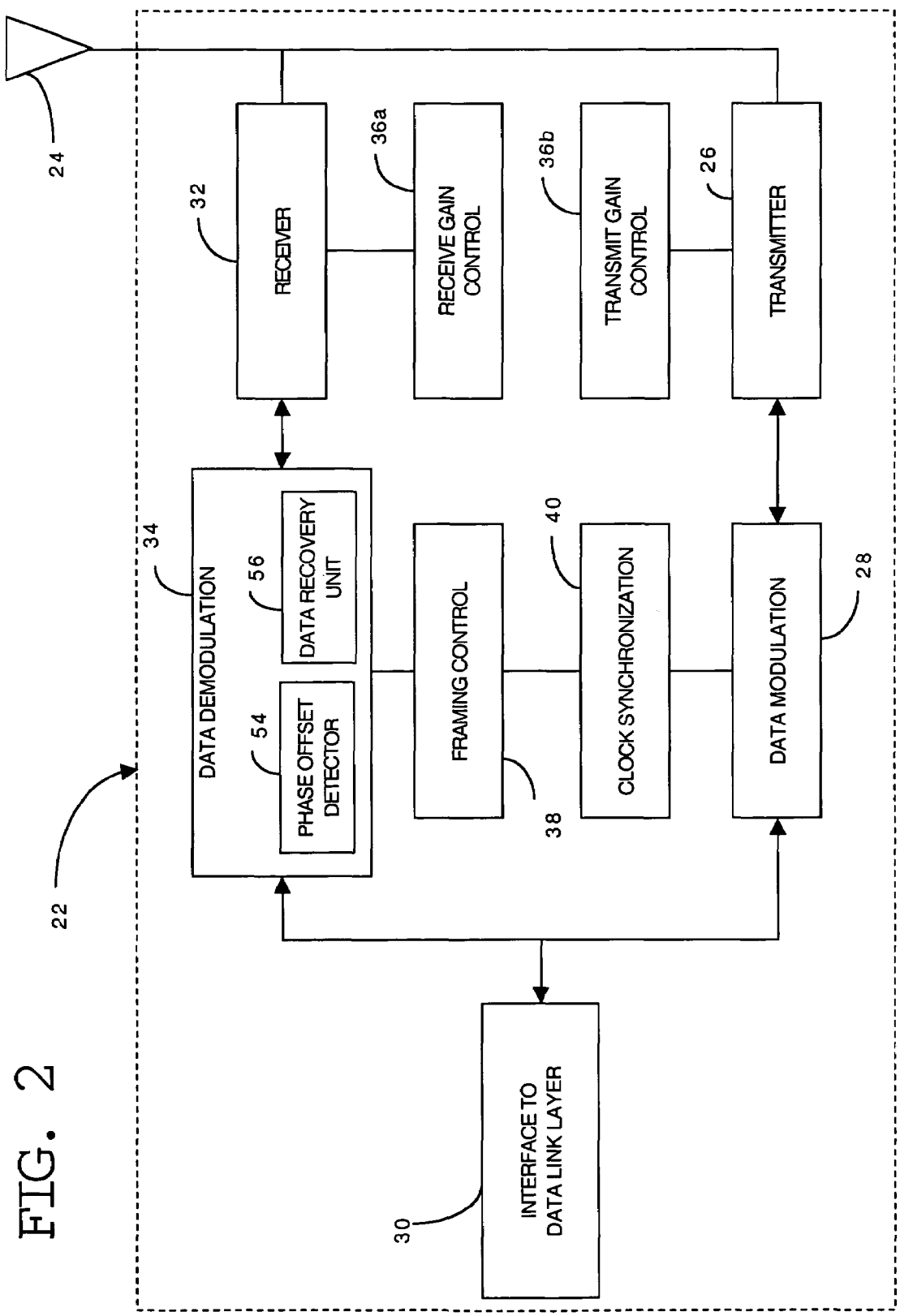
FIG. 2 is a functional block diagram of a transceiver node device in accordance with the invention.

Referring now to FIG. 2 as well as FIG. 1, a functional block diagram of the "Physical layer" implementation of a transceiver node device 22 in accordance with the present invention is shown. The "Physical layer" as described herein refers to the Physical layer according to the Open Systems Interconnection (OSI) Reference Model. This model is based on a proposal developed by the International Standards Organization (ISO) to deal with connecting systems that are open for communication with other systems.

Master transceiver 12 and slave transceivers 14a through 14n of the network 10 are structured and configured as transceiver device 22 as described herein. The transceiver node device 22 comprises an integrated circuit or like hardware device providing the functions described below. Transceiver device 22 comprises an antenna 24, a transmitter 26 connected to the antenna 24, a data modulation unit 28 connected to the transmitter 26, and an interface to Data Link Layer (DLL) 30 connected to the data modulation unit 28. The transceiver device 22 also includes a receiver 32 connected to the antenna 24 and a data de-modulation unit 34 connected to the receiver 32 and to the interface to the interface to Data Link Layer (DLL) 30. A receive gain control unit 36a is connected to the receiver 32, a transmit gain control unit 36b is connected to the transmitter 26. A framing control unit 38 is operatively coupled to the data modulation unit 28 and the data de-modulation unit 34. A clock synchronization unit 40 is also operatively coupled to the data modulation unit 28 and the data de-modulation unit 34.

Antenna 24 comprises a radio-frequency (RF) transducer as is known in the art and is preferably structured and configured as a receiving antenna and/or a transmitting antenna. As a receiving antenna, antenna 24 converts an electromagnetic (EM) field to an electric current, and as a transmitting antenna, converts an electric current to an EM field. In the preferred embodiment, antenna 24 is structured and configured as a ground plane antenna having an edge with a notch or cutout portion operating at a broad spectrum frequency ranging from about 2.5 gigahertz (GHz) to about 5 GHz with the center frequency at about 3.75 GHz. It will be appreciated that antenna 24 may be provided with various geometric structures in order to accommodate various frequency spectrum ranges.

Transceiver node device 22 includes hardware or circuitry which provides an interface to data link layer 30. The interface to data link layer 30 provides an interface or communication exchange layer between the Physical layer 22 and the "higher" layers according to the OSI reference model. The layer immediately "above" the Physical layer is the data link layer. Output information which is transmitted from the data link layer to the interface 30 is communicated to the data modulation unit 28 for further data processing. Conversely, input data from the data-demodulation unit 34 is communicated to the interface 30, which then transfers the data to the data link layer.

Transceiver node device 22 includes hardware or circuitry providing data modulation functions shown generally as data modulation unit 28. The data modulation unit 28 carries out the operation of converting data received from the interface 30 into an output stream of pulses. In the case of pulse amplitude modulation, the amplitude of the pulse represents a value for that symbol. The number of bits represented by a pulse depends on the dynamic range and the signal to noise ratio. The simplest case comprises on-off keying, where the presence of a pulse of any amplitude represents a "1", and the absence of a pulse represents "0". In this case, data modulation unit 28 causes a pulse to be transmitted at the appropriate bit time to represent a "1" or no pulse to be transmitted at the appropriate time to represents a "0". As described further below, the pulse stream produced by transceiver 22 must be synchronous with a master clock of the network 10 and must be sent at the appropriate time slot according to a frame definition defined for the network. The pulse stream is then communicated to transmitter 26 for transmission via antenna 24.

Transceiver node device 22 includes hardware or circuitry providing means for transmitting data to other transceivers on the network shown generally as transmitter 26. The transmitting means of transceiver 22 preferably comprises a wide band transmitter 26. Transmitter 26 is operatively coupled to the data modulation unit 28 and to the antenna 24. Transmitter 26 carries out the operation of transmitting the pulse stream received from modulation unit 28 and transmitting the pulse stream as electromagnetic pulses via antenna 24. In the preferred embodiment, information is transmitted via impulses having 100 picosecond (ps) risetime and 200 ps width, which corresponds to the 2.5 through 5 GHz bandwidth.

Transceiver node device 22 includes hardware or circuitry which provides means for receiving data from other transceivers shown generally as receiver 32. The receiving means of transmitter 22 preferably comprises a wide band receiver 32. Receiver 32 is operatively coupled to the antenna 24 and the data de-modulation unit 34. Receiver 32 carries out the operation of detecting electromagnetic pulse signals from antenna 24 and communicating the pulse stream to the data de-modulation unit 34. The received signal does not necessarily have the same spectrum content as the transmitted signal, and the spectrum content for received and transmitted signals vary according to the receive and transmit antenna impulse response. Typically, the received signal is shifted toward a lower frequency than the transmitted signal.

Transceiver node device 22 further includes hardware or circuitry providing means for controlling the gain of signals received and transmitted shown generally as gain control units 36a, 36b. The transmit gain control unit 36b carries out the operation of controlling the power output of the transmitter 26 and receive gain control unit 36a carries out the operation of controlling the input gain of the receiver 32.

As indicated above, the pulse stream produced by modulator 28 must be synchronous with the master clock of the network 10. In order to maintain a synchronized network, one device must serve the function of being a clock master and maintain the master clock for the network. Preferably, the master device 12 carries out the operation of the clock master. All other slave devices must synchronize with the master clock. The invention includes means for synchronizing the network system 10 provided by the clock synchronization unit 40 in transceiver 22.

Figure 3A:
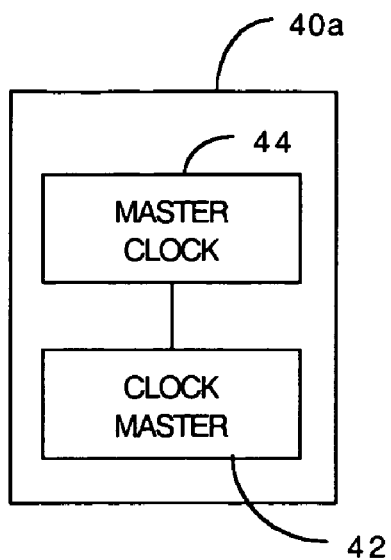
FIG. 3a is a functional block diagram of a master clock synchronization unit.

Referring to FIG. 3a as well as FIG. 1 and FIG. 2, a functional block diagram of a clock synchronization unit 40a for the master device 12 is shown. In the master device 12, the clock synchronization unit 40a includes hardware or circuitry providing the functions described herein. Clock synchronization unit 40a comprises a clock master function 42 which maintains a master clock 44 for the network 10. The master clock 44 runs at a multiple of the bit rate. As described in further detail below, transmit time is divided into "frames", and transceiver devices are assigned specific "slots" within each frame where the devices are permitted to transmit data. At least once per frame, the clock master function 42 issues a master sync code. The master sync code is a unique bit pattern that does not appear anywhere else in the frame which identifies the sender as the master device 12.

Figure 3B:
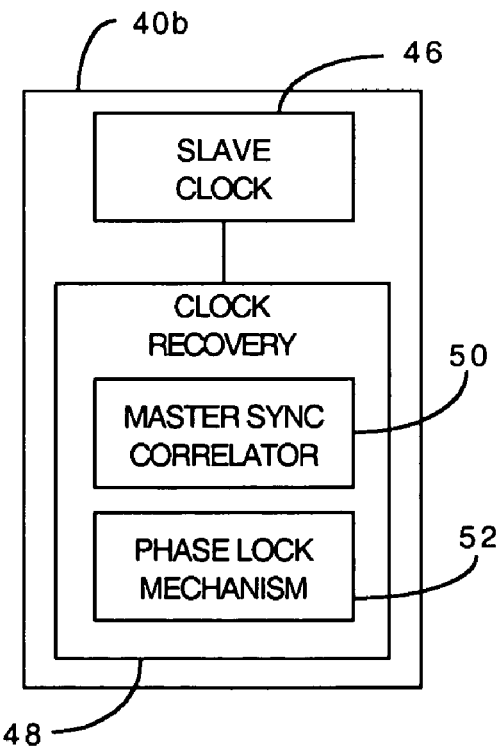
FIG. 3b is a functional block diagram of a slave clock synchronization unit.

Referring to FIG. 3b as well as FIG. 1 and FIG. 2, a functional block diagram of a clock synchronization unit 40b for the slave devices 14a through 14n is shown. In the slave devices 14a through 14n, the clock synchronization unit 40b includes hardware or circuitry providing the functions described herein. Clock synchronization unit 40b comprises a local or slave clock 46 and a clock recovery function 48. The slave clock 46 also runs at a multiple of the bit rate.

The clock recovery function 48 carries out the operation of scanning the incoming data stream received by receiver 32 to detect or otherwise ascertain the master sync code using one or more correlators. When the clock recovery function 48 detects the master sync code, the clock recovery function 48 will predict when the next master sync code will be transmitted. If the new master sync code is detected where predicted, the transceiver 22 will be considered "locked" or otherwise synchronized with the clock master 42 and will continue to monitor and verify future incoming master sync codes. If the clock recovery function 48 fails to detect a threshold number of consecutive master sync codes, lock will be considered lost. As each master sync code is received by the transceiver, a phase or delayed locked loop mechanism is used to adjust the phase of the slave clock 46 to that of the incoming pulse stream.

The clock recovery function 48 includes a master sync code correlator 50. A slave transceiver trying to achieve synchronization or "lock" with the master clock examines the incoming data stream to detect the master sync code, as described above. The master sync code correlator 50 carries out the operation of detecting the first incoming pulse and attempting to match each of the next arriving pulses to the next predicted or pre-computed pulse. After the initial master sync code is detected, the clock recovery function 48 of the slave transceiver device will perform a coarse phase adjustment of its bit-clock to be close to that of the incoming pulse stream. When the next master sync code is expected, a mask signal is used to examine the incoming pulse train stream only where valid pulses of the incoming master sync code are expected. The primary edge of the incoming pulse is compared with the rising edge of the local clock, and any difference in phase is adjusted using a phase-locked loop mechanism. If the incoming pulse stream matches the master sync code searched for, the correlator 50 signals a successful match. If the incoming pulse stream differs from the master sync code, the process is repeated. Multiple correlators may be used to perform staggered parallel searches in order to speed up the detection of the master sync code.

The clock recovery function 48 further includes a phase lock mechanism 52. As each predicted master sync code is detected at the slave transceivers, the phase lock mechanism 52 carries out the operation of determining the phase difference between the local slave clock 46 and the incoming pulses. The phase lock mechanism 52 adjusts the phase of the slave clock 46 so that the frequency and phase of the slave clock 46 is the same as that of the incoming pulses, thereby locking or synchronizing the local slave clock 46 to master clock 44 of the master transceiver 12.

Referring again to FIG. 2, as well as FIG. 1, the transceiver node device 22 includes hardware or circuitry which provides demodulating functions and is shown generally as a data demodulation unit 34. The data demodulation unit 34 carries out the operation of converting the input pulse stream from receiver 32 into a data stream for higher protocol layers. The data de-modulation unit 34 comprises a phase offset detector 54 and a data recovery unit 56. In an isochronous baseband wireless network, data streams will be received from different transceivers with different phase offsets. The phase offset is due to path propagation delays between the transmitter, the receiver and the master clock 44.

As described in further detail below, a transmitter will be assigned a data "slot" within a frame to transmit to another device. The phase offset detector 54 carries out the operation of ascertaining the phase delay between the expected zero-delay pulse location, and the actual position of the incoming pulses. Typically, a known training bit pattern is transmitted before the data is transmitted. The phase offset detector 54 in the receiving device detects or otherwise ascertains the training bit pattern and determines the phase offset of the incoming pulse from the internal clock. The phase determined is then communicated to the Data Recovery Unit 56. In the case of pulse amplitude modulation, the training sequence is also used to provide a known pulse amplitude sequence against which the modulated pulse amplitudes can be compared in the data transmission.

The Data Recovery Unit 56 in a receiving device carries out the operation of converting the incoming pulse stream data into bit data during time slots that a transmitting device is sending data to the receiving device. In the case of on-off keying modulation, the data recovery unit 56 carries out the operation of examining the pulse stream during the designated time slot or "window" for the presence or absence of a pulse. In pulse amplitude modulation, the data recovery unit 56 carries out the operation of examining the pulse stream during the designated time slot or "window" to ascertain the amplitude of the pulse signal. The "window" or time slot in which the receiving device examines pulse stream data determined by the expected location of the bit due to the encoding mechanism and the offset determined by the phase offset detector 54. The information converted by the data de-modulation unit 34 is then communicated to the interface to data link layer 30 for further processing.

Figure 4:
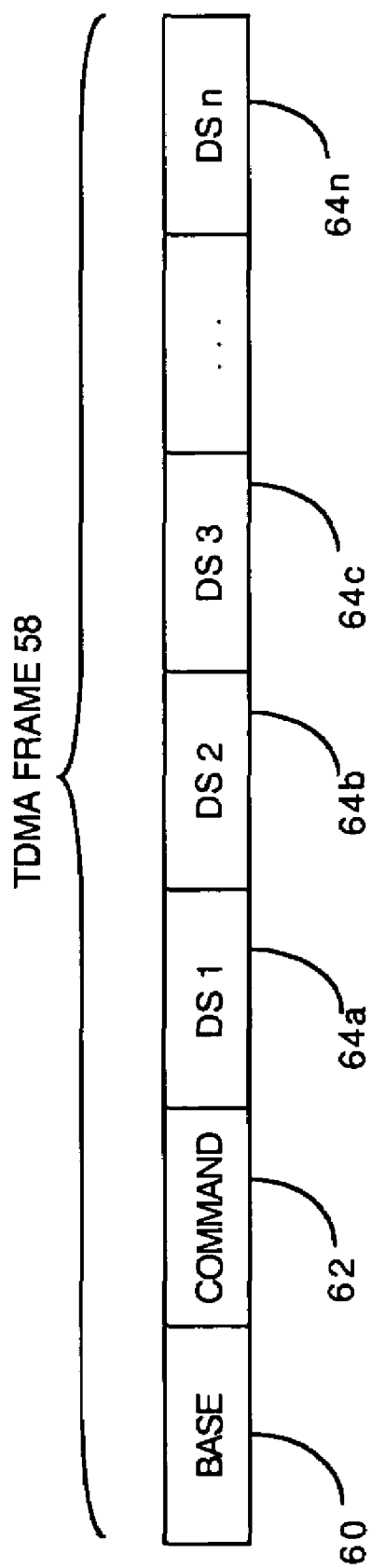
FIG. 4 is a time division multiple access frame definition in accordance with the present invention.

Referring now to FIG. 4 as well as FIG. 1 and FIG. 2, a Time Division Multiple Access (TDMA) frame definition is shown and generally designated as 58. The TDMA frame definition 58 is provided and defined by the data link protocol software of the present invention. More particularly, the TDMA frame 58 is defined by the Medium Access Control (MAC) sublayer software residing within the Data Link Layer according the OSI Reference model.

The means for managing the data transmission between the transceiver nodes of the network 10 is provided by software algorithms running and executing in the Medium Access Control. The Medium Access Control protocol provides algorithms, routines and other program means for managing and controlling access to the TDMA frame definition 58 and its associated slot components. The architecture of TDMA frame definition 58 provides for isochronous data communication between the transceivers 12, 14a through 14n of the network 10 by providing a means for sharing the data transmit time that permits each transceiver of the network to transmit data during a specific time chunk or slot. The TDMA frame architecture divides data transmission time into discrete data "frames". Frames are further subdivided into "slots".

In the preferred embodiment, the TDMA frame definition 58 comprises a master slot 60, a command slot 62, and a plurality of data slots 64a through 64n. The master slot 60 contains a synchronizing beacon or "master sync". More preferably, the "master sync" is the same code as the "master sync code" as described earlier for clock synchronization unit 40. The command slot 62 contains protocol messages exchanged between the transceiver devices of the network. Generally, each of the data slots 64a through 64n provides data transmission time for a corresponding slave device 14a through 14n of the network 10. Preferably, each data slot assigned is structured and configured to have a variable bit width and is dynamically assigned by the master device. In an alternative arrangement, the slave devices 14a through 14n request the use of one or more of the data slots 64a through 64n for data transmission. In either arrangement, the master may also be assigned one or more slots to transmit data to slave devices. If random access devices are connected to the network, these devices may be assigned a common random access time slot by the master. These devices will communicate using a CSMA-CD or similar protocol within the allocated time slot.

As noted above, the transceiver device 22 includes a framing control function 38. The framing control function 38 carries out the operation of generating and maintaining the time frame information. In the master device 12 the framing control function 38 delineates each new frame by Start-Of-Frame (SOF) symbols. The SOF symbols are unique symbols, which do not appear anywhere else within the frame and mark the start of each frame. In the preferred embodiment, the SOF symbols serve as the "master sync" and as the "master sync code" for the network and are transmitted in the master slot 60 of frame 58. These SOF symbols are used by the framing control function 38 in each of the slave devices 14a through 14n on the network to ascertain the beginning of each frame 58 from the incoming data stream. For example, in one illustrative embodiment, the invention utilizes a 10-bit SOF "master sync" code of "0111111110".

Various encoding schemes known in the art may be used to guarantee that the SOF code will not appear anywhere else in the data sequence of the frame. For example, a common encoding scheme is 4B/5B encoding, where a 4-bit values is encoded as a 5-bit value. Several criteria or "rules" specified in a 4B/5B code table, such as "each encoded 5-bit value may contain no more than three ones or three zeros" and "each encoded 5-bit value may not end with three ones or three zeros", ensure that a pulse stream will not have a string of six or more ones or zeros. Other techniques known in the art may also be used including, for example, bit stuffing or zero stuffing.

The master transceiver 12 carries out the operation of managing network data communication via the exchange of "protocol messages" in the command slot 62 of frame 58. The master transceiver 12 carries out the operation of authenticating slave transceivers 14a through 14n, assigning and withdrawing data time slots 64a through 64n for the slave transceivers 14a through 14n, and controlling power of the slave transceivers 14a through 14n.

Master transceiver 12 authenticates or registers each slave transceiver by ascertaining the "state" of each of the slave transceivers of the network 10. Each transceiver operates as a finite-state machine having at least three states: offline, online, and engaged. When a transceiver is in the offline state, the transceiver is considered "unregistered" and is not available for communication with the other devices on the network 10. Each slave transceiver must first be "registered" with master transceiver 12 before the slave transceiver is assigned or allocated a data slot within the TDMA frame 58. Once a transceiver is registered with the master transceiver 12, the device is considered "online".

A slave transceiver that is in the "online" state is ready to send data or ready to receive data from the other devices on the network 10. Additionally, an "online" transceiver is one which is not currently transmitting or receiving "non-protocol" data. Non-protocol data is data other than that used for authenticating the "state" of the transceiver devices.

A transceiver is "engaged" when the transceiver is currently transmitting and/or receiving "non-protocol" data. Each slave device maintains and tracks its state by storing its state information internally, usually in random access memory (RAM). The state of each slave device is further maintained and tracked by the master device 12 by storing the states of the slaves in a master table (not shown) stored in RAM.

In operation, the master transceiver 12 periodically broadcasts an ALOHA packet in the command slot 62 to ascertain or otherwise detect "unregistered" slave devices and to receive command requests from the slave transceivers of then network. More generally, an ALOHA broadcast is an invitation to slave transceivers to send their pending protocol messages. This arrangement is known as "slotted ALOHA" because all protocol messages including the ALOHA broadcast are sent during a predetermined time slot. In the preferred embodiment, the ALOHA broadcast is transmitted at a predetermined interval. Responsive to this ALOHA packet and in the next immediate TDMA frame, an "unregistered" slave device 14*n* transmits a signal in command slot 62 identifying itself as slave device 14*n* and acknowledging the master device with a registration or "discovery" (DISC) request indicating additional information, such as the bandwidth capabilities of the device. When the registration request is received by the master transceiver 12, the master table records in the master table that device 14*n* is "online". The master transceiver 12 also transmits a confirmation in command slot 62 to the slave device 14*n* that the state of slave device 14*n* has changed to "online".

When the slave device 14*n* receives the confirmation command from the master device 12, the slave device 14*n* then changes its internal state to "online". If more than one slave transceiver replies with an acknowledgement to an ALOHA broadcast in the same frame, a packet collision may occur because both transceivers are attempting to occupy the same command slot 62 within the frame 58. When a collision is detected in response to an ALOHA broadcast, the master transceiver 12 transmits another ALOHA message directed to a subset of the slave devices based on a binary-search style scheme, a random delay scheme or other similar searching means known in the art.

The master transceiver 12 also periodically verifies each slave transceiver device that is "online" or "engaged" according the master table to ascertain whether any failures have occurred at the slave device using a "time-out" based scheme. According to this time-out scheme, the master transceiver 12 periodically transmits a POLL packet in command slot 62 to a specific "online" slave device 14*n* from the master table to ascertain the state of the slave device 14*n*. In the preferred embodiment, the master transceiver 12 transmits a POLL signal every ten seconds. Responsive this POLL packet, slave device 14*n* transmits an acknowledgement signal in the command slot 62 of the next immediate frame identifying itself as slave device 14*n* and acknowledging its state. Responsive to this acknowledgement signal, the master transceiver 12 confirms verification of device 14*n* and continues with other tasks. In the event slave device 14*n* is shutdown or otherwise unavailable, master transceiver 12 will not receive a return acknowledgement and master transceiver 12 will fail to verify device 14*n*. After a predetermined number failed verifications from a slave device, a time-out is triggered, and the master transceiver 12 will change the state of such slave device to "offline".

In the command slot 62, the flow of protocol messages between the transceivers is preferably governed by a "sequence retransmission request" (SRQ) protocol scheme. The SRQ protocol framework provides confirmation of a protocol transaction after the entire protocol sequence is completed. Effectiveness and success of the transmission of a protocol sequence are acknowledged at the completion of the entire protocol sequence rather than immediately after the transmission of each message as in the traditional Automatic Retransmission reQuest (ARQ) approach. Because a protocol sequence may include a plurality of protocol messages, the overhead associated with acknowledging each protocol message is avoided, and bandwidth use is improved thereby. The SRQ protocol scheme is described further detail in copending patent application Ser. No. 09/393,121 entitled "MEDIUM ACCESS CONTROL PROTOCOL FOR CENTRALIZED WIRELESS NETWORK COMMUNICATION MANAGEMENT" having filed on Sep. 10, 1999 which is expressly incorporated herein by reference.

Referring again to FIG. 3 as well as FIG. 1 and FIG. 2, a plurality of data slots 64*a* through 64*n* is provided for each slave transceiver 14*a* through 14*n* of the network 10 which is registered as "online". The master transceiver 12 further manages the transmission of information in slots 64*a* through 64*n* through traditional Time Division Multiple Access (TDMA). The command slot 62 operates in traditional TDMA mode in addition to the "slotted ALOHA" mode described above for inviting protocol messages from the slave transceivers as determined by the master transceiver 12. The slotted ALOHA mode, which is active when the master invites a protocol message, continues until the slave protocol message is received without collision. Once the slave protocol messages is received or "captured" by the master transceiver, the command slot operates in a regular TDMA mode until the entire protocol exchange sequence between the master device and the "captured" slave device is completed. Traditional TDMA mode is used, for example, when a first slave transceiver makes a data link request to the master transceiver in order to communicate data to a second slave transceiver.

For example, a first slave transceiver 14*a* (microphone) has audio data to transmit to a second slave transceiver 14*b* (speaker). The master transceiver 12 manages this data transaction in the manner and sequence described herein. As indicated above, the master transceiver periodically sends an ALOHA broadcast to invite protocol messages from the slave devices of the network. Responsive to this ALOHA broadcast, slave transceiver 14*a* transmits a data-link request (REQ) to master transceiver 12 identifying itself as the originating transceiver and identifying the target slave transceiver 14*b*. Responsive to this REQ request, the master transceiver 12 verifies the states of originating or source transceiver 14*a* and target transceiver 14*a* according to the master table. If both originating transceiver and target transceiver are "online" according to the master table, the master transceiver transmits a base acknowledge (BACK) to the originating transceiver 14a and a service request (SREQ) to the target transceiver indicating the identity of the originating transceiver 14a and assigns a data slot to the originating transceiver 14a within the TDMA frame 58 for data communication. If target transceiver is "offline", the master transceiver 12 transmits a base negative acknowledge (BNACK) packet to the originating transceiver to confirm the unavailability of the target transceiver. If the target transceiver is "engaged" in communication with another device, the master transceiver 12 transmits a base busy (BBUSY) packet to the originating transceiver to indicate the unavailability of the target transceiver.

When the originating transceiver 14a receives the BACK packet, the transceiver 14a waits for a data-link confirmation from the master transceiver 1, after which the transceiver 14a begins transmitting data within a dynamically assigned data slot. Responsive to the SREQ packet from the master transceiver 12, the target transceiver 14b transmits a return acknowledge (ACK) to the master transceiver 12 indicating that transceiver 14b is ready to receive data. The transceiver 14b also begins to monitor the corresponding data slot assigned to the originating transceiver 14a. Responsive to the return ACK from target transceiver 14b, the master transceiver 12 transmits a data-link confirmation to originating transceiver 14a to indicate that target transceiver is ready to receive data communication.

After originating transceiver 14a completes its data transmission to the target transceiver 14b, the transceiver 14a terminates its data link by initiating a termination sequence. As indicated above, the master transceiver 12 will periodically transmit an ALOHA broadcast to find unregistered device nodes or to invite protocol requests from registered device nodes.

The termination sequence comprises communicating a terminate (TERM) process by the originating transceiver 14a to the master transceiver 12 in response to an ALOHA message from the master transceiver 12. In transmitting the TERM message, the originating transceiver may also identify the originating device 14a and the target device 14b. Responsive to this TERM message, the master transceiver 12 carries out the operation of checking the states of the originating transceiver 14a and the target transceiver 14b, and transmitting to transceiver 14b a Service Termination (STERM) command.

The master transceiver verifies the state of the originating device and the target device to confirm that both devices are currently engaged for communication. If both devices are engaged, the master transceiver 12 transmits a reply BACK message to the originating transceiver to acknowledge its termination request and to indicate that the status of originating device has been changed to "online" in the master table. Additionally, master transceiver transmits a STERM message to target transceiver 14b to indicate that originating transceiver 14a is terminating data communication with target transceiver 14b.

Responsive to the STERM message, the target transceiver 14b carries out the operation of checking its internal state, terminating the reception of data, and replying with an acknowledgement (ACK). The target transceiver 14b first checks its internal state to ensure that it is engaged in communication with originating transceiver 14a. If target transceiver 14b is engaged with a different transceiver, it replies with a NACK message to the master transceiver 12 to indicate target transceiver 14b is not currently engaged with originating transceiver 14a. If target transceiver 14b is engaged with transceiver 14a, then target transceiver 14b stops receiving data from transceiver 14a and sets its internal state to "online". Target transceiver 14b then transmits to master transceiver 12 an ACK message to indicate that it has terminated communication with transceiver 14a and that it has changed it state to "online".

When the master transceiver 12 receives the ACK message from the target transceiver 14b, it changes the state of target transceiver 14b in the master table to "online" and replies to target transceiver 14b with a confirmation of the state change. The master transceiver 12 also considers the data slot which was assigned to originating transceiver 14a as released from use and available for reallocation. When a NACK message is received by master transceiver 12 from target transceiver 14b, a severe error is recognized by master transceiver 12 because this state was not previously registered with the master table. The master transceiver then attempts a STERM sequence with the remaining related slave devices until the proper target transceiver is discovered or otherwise ascertained.

When a user of a slave device terminates or interrupts power to the slave or otherwise makes the slave unavailable for communication, the device preferably initiates a shutdown sequence prior to such termination. The shutdown sequence comprises a shutdown (SHUT) message from the slave device 14n to the master transceiver 12, in response to an ALOHA broadcast from the master 12. Responsive to the SHUT message, the master 12 replies to the slave device 14n with a BACK message indicating that state of slave device 14n has been changed to "offline" in the master table. Responsive to the BACK message, the slave device 14n changes its internal state to "offline" and shuts down.

Figure 5:
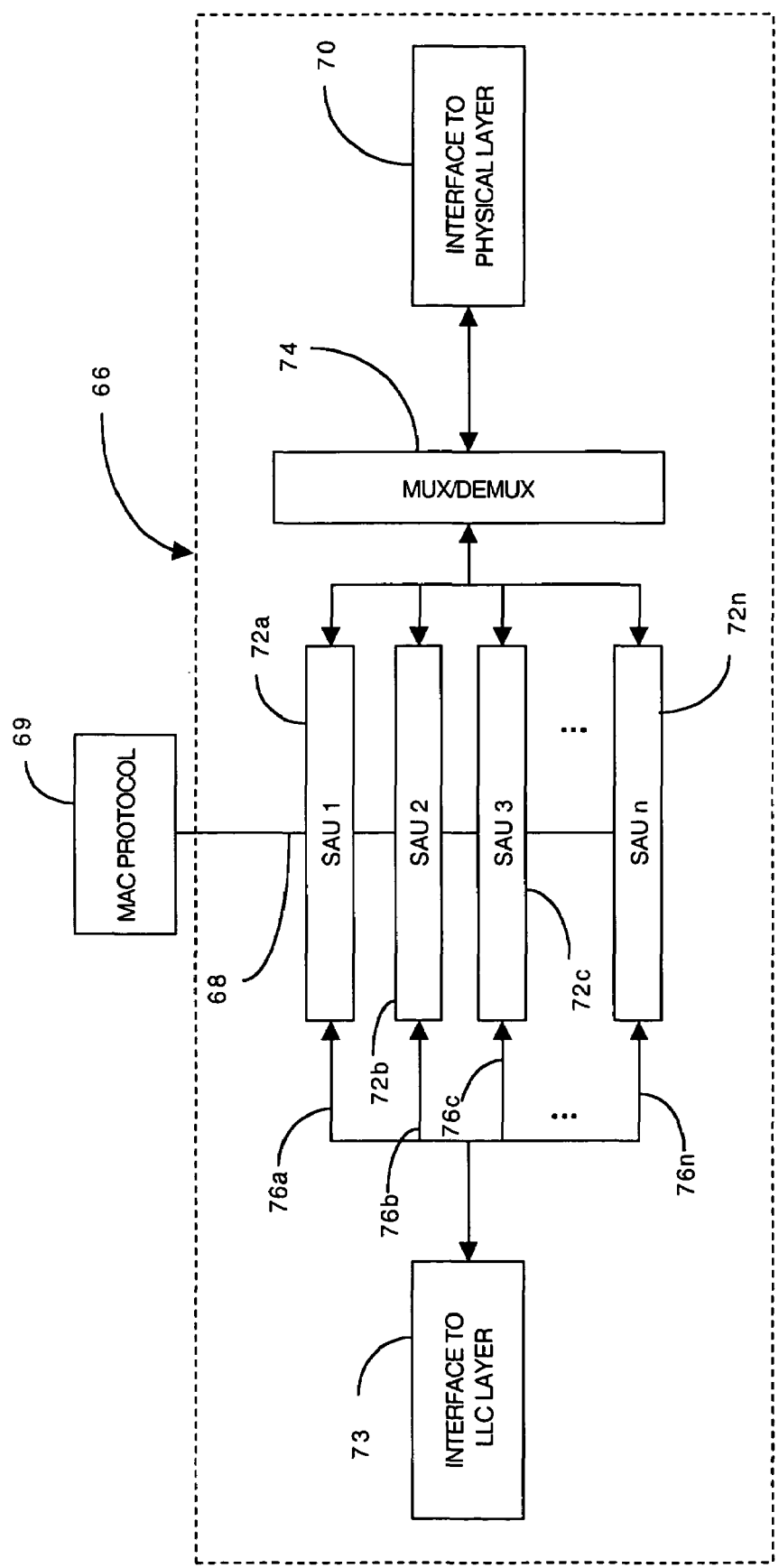
FIG. 5 is a functional block diagram of the Medium Access Control hardware interface of the present invention.

Referring now to FIG. 5, a functional block diagram of the Medium Access Control hardware interface of the present invention is shown and generally designated as MAC 66. In general, the MAC 66 is provided at the Data Link Layer between the Network Layer and the Physical Layer of the OSI reference model. More particularly, the MAC 66 provides the hardware circuitry within Medium Access Control (MAC) sublayer of the Data Link Layer according the OSI reference model. The Medium Access Control protocol provided by the present invention provides the software for controlling the processes of the various components of the MAC 66 as described below.

The MAC 66 comprises an integrated circuit or like hardware device providing the functions described herein. The MAC 66 provides means associated with each transceiver for connecting multiple data links received from the Logical Link Layer to a single physical TDMA link. The MAC 66 comprises a communication interface 68 for providing communication with the Medium Access Control Protocol 69, a Physical Layer interface 70 for communication with the Physical layer, a plurality of slot allocation units (SAU) 72a through 72n each operatively coupled to the communication interface 68, a Multiplexer/Demultiplexer (Mux/Demux) unit 74 operatively coupled to the Physical Layer interface 70 and each of the SAU 72a through 72n, and a Logical Link Control (LLC) interface 73 connected to each of the SAU 72a through 72n. A plurality of data interfaces 76a through 76n are also provided for transmitting data to and receiving data from the LLC interface 73. Each data interface 76a through 76n is connected to a corresponding SAU 72a through 72n.

Data streams in the present invention will flow in both directions. For example, output data will be transmitted from higher level protocols through the DLL hardware 66 and out to the Physical Layer via interface 70. Input data is received from the Physical Layer through interface 70 into the MAC 66 and then communicated to the higher level protocols. Within the MAC 66 the data path comprises the data interfaces 76a through 76n connected to the SAU 72a through 2n, the SAU 72a through 72n connected to the Mux/Demux 74, and the Mux/Demux 74 connected to the Physical Layer interface 70. The direction of data flow within each SAU 72a through 72n is controlled by the Medium Access Control protocol 69 via communication interface 68. The communication interface 68 is preferably separated from the data path through MAC 66. This arrangement provides simple data sources, such as audio streaming devices, a direct connection to the MAC 66.

The Mux/Demux 74 carries out the operation of merging outgoing data streams from the SAU 72a through 72n into a single signal transmitted by the Physical Layer. In the preferred embodiment, a TDMA scheme is used for data transmission. Under the TDMA multiple access definition scheme, only one device may be transmitting at any given time. In this case, the Mux/Demux 74 is connected to the outputs of each SAU. The output of the Mux/Demux 74 is then operatively coupled to the Physical Layer interface 70. The Mux/Demux 74 also carries out the operation of distributing incoming network data received from the Physical Layer via interface 70 into the SAU 72a through 72n. Generally, the currently active SAU will receive this incoming data.

Figure 6:
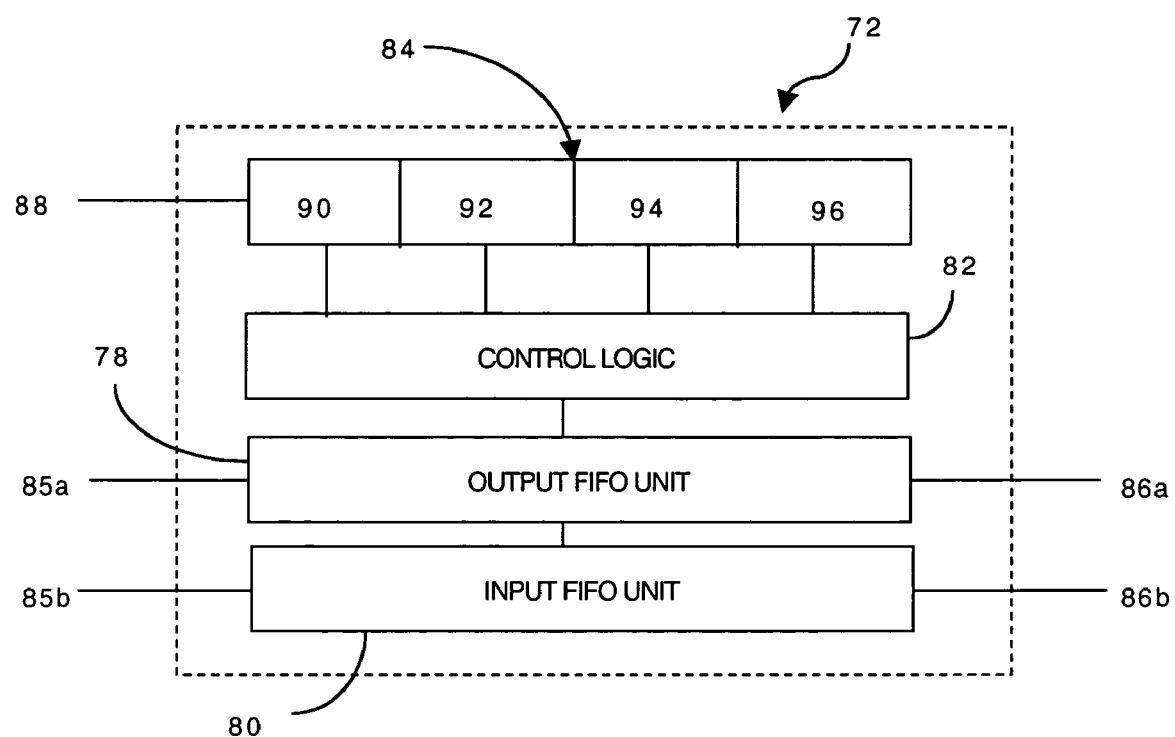
FIG. 6 is a functional block diagram of a slot allocation unit provided in the Medium Access Control hardware.

Referring now to FIG. 6 as well as FIG. 5, a block diagram of an SAU unit is shown and designated as 72. Each SAU unit 72a through 72n are structured and configured as SAU 72. SAU 72 comprises an output buffer unit 78, an input buffer unit 80, a control logic unit 82 connected to the output buffer unit 78 and the input buffer unit 80, and control status registers 84 connected to the control logic unit 82. The output buffer unit 78 stores data to be transmitted from a first device to another device in a First-In-First-Out (FIFO) buffer (not shown), encodes the buffer's output using a 4B/5B or similar encoding scheme and provides the resulting bit stream to the Mux/Demux unit 74 via line 86a. The data to be transmitted is provided through the interface 73 via line 85a. The input buffer unit 80 receives data from the Physical layer through the Mux/Demux unit 74 via line 86b, decodes it according the same 4B/5B or similar encoding scheme, and stores the data in a FIFO buffer (not shown) which is connected to the data path interface 73 via line 85b. Lines 85a and 85b are operatively coupled to data interfaces 76a through 76n for communication with interface 73. Lines 86a and 86b are operatively coupled for communication with Mux/Demux unit 74.

The control logic unit 82 comprises a state machine that controls the operation of the output buffer unit 78 and input buffer unit 80 as well as the communication between the MAC and the Logical Link Layer (LLC), and the MAC and the Physical Layer. The values of the control registers 84 are set by the LLC above the MAC layer via line 88 and control the operation of the SAU.

The control registers 84 comprise a SAU enable register 90, a data transfer direction register 92, a slot start time register 94, and a slot length register 96. The SAU enable register 90 determines whether the SAU 72 should transmit or receive data. The data transfer direction register 92 determines whether the SAU 72 is set up to transmit to the Physical Layer or to receive from the Physical Layer. The slot start time register 94 provides the SAU 72 with the time offset of the slot measured from the start of the frame, during which the SAU 72 transmits data to the Physical Layer.

The slot length register 96 determines the length of the slot. The status registers 84 provide the LLC with information about the current state of the SAU. The status registers comprise an input buffer unit empty flag, an input buffer unit full flag, an output buffer unit empty flag, an output buffer unit full flag, and an input decoder error counter. The buffer unit empty flag indicate whether the respective buffer units are empty (i.e., contain no data). The buffer unit full flag indicate whether the respective buffer units are full (i.e., cannot store additional data). The input decoder error counter indicates the number of error detected during the decoding of data arriving from the Physical Layer.

The SAU 72 transmits or receives data autonomously after being set up by the LLC. The setup consists of writing appropriate values into the data transfer direction register 92, the slot start time register 94, and the slot length register 96 and then enabling the SAU 72 by asserting the SAU enable register 90. The slot start time and slot length values provided in registers 94, 96 respectively are designated to the communicating device by the network master 12. These values are determined by the master 12 in such a way that no two transmitters in the network transmit at the same time, a requirement of the TDMA communication scheme. During transmission, the SAU 72 will monitor the current time offset within the frame and compare it with the slot start time. When the two values are equal, the SAU 72 will provide the Physical Layer with encoded data bits from the output buffer 78 until the frame has reached the end of the time slot allocated to the SAU 72 as determined by the slot length register 96. If the output FIFO buffer is empty during the allocated time slot, the SAU 72 will transmit special bit codes indicating to the receiver that there is no data being transmitted.

Likewise, the SAU 72 will monitor the current time offset within the frame during data reception and compare it to the slot start time register 94. When the two values are equal, the SAU 72 will acquire data from the Physical Layer through the Mux/Demux Unit 74, decode it and store the decoded data in the input FIFO buffer. If the decoder detects a transmission error, such as a bit code sequence not found in the 4B/5B encoding table, the data stored in the input FIFO buffer is marked as invalid and the input decoder error counter is incremented. If the decoder detects special bit codes indicating empty data, the latter are ignored and will not be stored in the input FIFO buffer.

Accordingly, it will be seen that this invention provides a wireless communication network system for isochronous data transfer between node devices of the network, which provides a master node device having means for managing the data transmission between the other node devices of the network system, which further provides means for framing data transmission and means for synchronizing the network communication protocol, thus providing a means for sharing the transport medium between the node devices of the network so that each node device has a designated transmit time slot for communicating data. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An ultra-wideband wireless communication network system comprising at least three transceivers, each said transceiver having a transmitter and a receiver, one of said transceivers being structured and configured as a master device, and master device structured and configured to manage data transmission between said transceivers, and a Medium Access Control hardware interface comprising a multiplexer/demultiplexer unit and a plurality of slot allocation units, said multiplexer/demultiplexer unit operatively coupled to said plurality of slot allocation units, wherein said transceivers operate according to a Medium Access Control protocol having a time division multiple access frame definition, said protocol structured and configured to operate in aloha mode and time division multiple access mode.

2. The system of claim 1, further comprising a frame definition having a master slot, a command slot, and a plurality of data slots, said master having a master sync code, a protocol operating in slotted aloha mode and time division multiple access mode, said master device managing said protocol and said data slots in said protocol.

3. The system of claim 2, wherein said transmitters are structured and configured to emit radio frequency pulses operating with baseband wireless technology and said receivers are structured and configured to receive radio frequency pulses.

4. The system of claim 3, wherein said transceivers are structured and configured to transfer data to other said transceivers isochronously.

5. The system of claim 4, wherein each said slave transceiver further comprises a local clock therein, said master transceiver further comprising a master clock therein, each said local clock synchronized with said master clock.

6. The system of claim 2, wherein said transmitters are structured and configured to emit radio frequency pulses operating with ultra-wide band wireless technology and said receivers are structured and configured to receive radio frequency pulses.

7. The system of claim 6, wherein said transceivers are structured and configured to transfer data to other said transceivers isochronously.

8. The system of claim 7, wherein each said slave transceiver further comprises a local clock therein, said master transceiver further comprising a master clock therein, each said local clock synchronized with said master clock.

9. An ultra-wideband wireless communication network system comprising at least three transceivers each said transceiver having a transmitter and a receiver, one of said transceivers being structured and configured as a master device, and master device structured and configured to manage data transmission between said transceivers, and a Medium Access Control hardware interface comprising a multiplexer/demultiplexer unit and a plurality of slot allocation units, said multiplexer/demultiplexer unit operatively coupled to said plurality of slot allocation units, and a frame definition having a master slot, a command slot, and a plurality of data slots, said master having a master sync code, a protocol operating in slotted aloha mode and time division multiple access mode, said master device managing said protocol and said data slots in said protocol.

10. The system of claim 9, wherein said transmitters are structured and configured to emit radio frequency pulses operating with baseband wireless technology and said receivers are structured and configured to receive radio frequency pulses.

11. The system of claim 10, wherein said transceivers are structured and configured to transfer data to other said transceivers isochronously.

12. The system of claim 11, wherein each said slave transceiver further comprises a local clock therein, said master transceiver further comprising a master clock therein, each said local clock synchronized with said master clock.

13. The system of claim 9, wherein said transmitters are structured and configured to emit radio frequency pulses operating with ultra-wide band wireless technology and said receivers are structured and configured to receive radio frequency pulses.

14. The system of claim 13, wherein said transceivers are structured and configured to transfer data to other said transceivers isochronously.

15. The system of claim 14, wherein each said slave transceiver further comprises a local clock therein, said master transceiver further comprising a master clock therein, each said local clock synchronized with said master clock.

16. The system of claim 1, wherein said transmitters are structured and configured to emit radio frequency pulses operating with baseband wireless technology and said receivers are structured and configured to receive radio frequency pulses.

17. The system of claim 16, wherein said transceivers are structured and configured to transfer data to other said transceivers isochronously.

18. The system of claim 17, wherein each said slave transceiver further comprises a local clock therein, said master transceiver further comprising a master clock therein, each said local clock synchronized with said master clock.

19. The system of claim 1, wherein said transmitters are structured and configured to emit radio frequency pulses operating with ultra-wide band wireless technology and said receivers are structured and configured to receive radio frequency pulses.

20. The system of claim 19, wherein said transceivers are structured and configured to transfer data to other said transceivers isochronously.

21. The system of claim 20, wherein each said slave transceiver further comprises a local clock therein, said master transceiver further comprising a master clock therein, each said local clock synchronized with said master clock.

22. The system of claim 1, wherein said transceivers are structured and configured to transfer data to other said transceivers isochronously.

23. The system of claim 22, wherein each said slave transceiver further comprises a local clock therein, said master transceiver further comprising a master clock therein, each said local clock synchronized with said master clock.

24. The system of claim 1, wherein each said slave transceiver further comprises a local clock therein, said master transceiver further comprising a master clock therein, each said local clock synchronized with said master clock.

25. The system of claim 22, wherein said transmitters are structured and configured to emit radio frequency pulses operating with baseband wireless technology and said receivers are structured and configured to receive radio frequency pulses.

26. The system of claim 25, wherein said transceivers are structured and configured to transfer data to other said transceivers isochronously.

27. An ultra-wideband wireless communication network system, comprising:
　at least three transceivers, one of which is structured and configured as a master device to manage data transmission between said transceivers;
　a transmitter in each said transceiver;
　a receiver in each said transceiver; and
　a Medium Access Control unit including a Physical layer interface, a multiplexer/demultiplexer unit operatively coupled to said Physical layer interface, a plurality of slot allocation units operatively coupled to said multiplexer/demultiplexer, an interface to higher level protocols operatively coupled to said plurality of slot allocation units.

28. The system of claim 27, wherein said master device includes a time division multiple access frame definition and a framing control function to frame data transmission between said transceivers.

29. The system of claim 28, wherein said transceivers operate according to a time division multiple access frame definition to synchronize said network system.

30. The system of claim 29, wherein each said transceiver further comprises:
(a) a data modulator; and
(b) a data demodulator.

31. The system of claim 30, further comprising a time division multiple access frame structure having a master slot, a command slot, and a plurality of data slots.

32. The system of claim 27, wherein said transceivers operate according to a time division multiple access frame definition to synchronize said network system.

33. The system of claim 32, wherein each said transceiver further comprises:
(a) a data modulator; and
(b) a data demodulator.

34. The system of claim 33, further comprising a time division multiple access frame structure having a master slot, a command slot, and a plurality of data slots.

35. The system of claim 34, wherein each said transceiver further comprises:
(a) a data modulator; and
(b) a data demodulator.

36. The system of claim 34, further comprising a time division multiple access frame structure having a master slot, a command slot, and a plurality of data slots.

37. The system of claim 27, further comprising a time division multiple access frame structure having a master slot, a command slot, and a plurality of data slots.

38. An ultra-wideband wireless communication network system comprising at least three transceivers, each said transceiver having a transmitter and a receiver, one of said transceivers being structured and configured as a master device, and said master device structured and configured to manage data transmission between said transceivers, wherein each said transceiver further comprises a framing controller, said framing controller having means for generating and maintaining time frame information for said network system, wherein said transceivers operate according to a Medium Access Control protocol having a time division multiple access frame definition, said protocol structured and configured to operate in aloha mode and time division multiple access mode, said system further comprising a frame definition having a master slot, a command slot, and a plurality of data slots, said master device having a master sync code, a protocol operating in slotted aloha mode and time division multiple access mode, said master device managing said protocol and said data slots in said protocol, and a Medium Access Control hardware interface comprising a multiplexer/demultiplexer unit and a plurality of slot allocation units, said multiplexer/demultiplexer unit operatively coupled to said plurality of slot allocation units.

39. The system of claim 38, wherein said transmitters are structured and configured to emit radio frequency pulses operating with baseband wireless technology and said receivers are structured and configured to receive radio frequency pulses.

40. The system of claim 39, wherein said transceivers are structured and configured to transfer data to other said transceivers isochronously.

41. The system of claim 40, wherein each said slave transceiver further comprises a local clock therein, said master transceiver further comprising a master clock therein, each said local clock synchronized with said master clock.

42. An ultra-wideband wireless communication network system comprising at least three transceivers, with each transceiver including a Medium Access Control protocol having a time division multiple access frame definition, each said transceiver having a transmitter and a receiver, one of said transceivers being structured and configured as a master device, said master device structured and configured to manage direct data transmission between said at least three transceivers, wherein each transceiver further comprises a framing controller, said framing controller having means for generating and maintaining time frame information for said network system, wherein said transmitters are structured and configured to emit radio frequency pulses operating with ultra-wide band technology and said receivers are structured and configured to receive said radio pulses.

43. The system of claim 42, wherein said transceivers are structured and configured to transfer data to other said transceivers isochronously.

44. The system of claim 43, wherein each said slave transceiver further comprises a local clock therein, said master transceiver further comprising a master clock therein, each said local clock synchronized with said master clock.

45. An ultra-wideband wireless communication network system comprising at least three transceivers, each said transceiver having a transmitter and a receiver, one of said transceivers being structured and configured as a master device, and said master device structured and configured to manage data transmission between said transceivers, wherein each said transceiver further comprises a framing controller, said framing controller having means for generating and maintaining time frame information for said network system, said system further comprising a frame definition having a master slot, a command slot, and a plurality of data slots, said master device having a master sync code, a protocol operating in slotted aloha mode and time division multiple access mode, said master device managing said protocol and said data slots in said protocol.

46. The system of claim 45, further comprising a Medium Access Control hardware interface comprising a multiplexer/demultiplexer unit and a plurality of slot allocation units, said multiplexer/demultiplexer unit operatively coupled to said plurality of slot allocation units.

47. The system of claim 46, wherein said transmitters are structured and configured to emit radio frequency pulses operating with baseband wireless technology and said receivers are structured and configured to receive radio frequency pulses.

48. The system of claim 47, wherein said transceivers are structured and configured to transfer data to other said transceivers isochronously.

49. The system of claim 48, wherein each said slave transceiver further comprises a local clock therein, said master transceiver further comprising a master clock therein, each said local clock synchronized with said master clock.

50. An ultra-wideband wireless communication network system comprising at least three transceivers, each said transceiver having a transmitter and a receiver, one of said transceivers being structured and configured as a master device, and master device structured and configured to manage data transmission between said transceivers, wherein each said transceiver further comprises a framing controller, said framing controller having means for generating and maintaining time frame information for said network system, wherein said transceivers operate according to a Medium Access Control protocol having a time division multiple access frame definition, said protocol structured and configured to operate in aloha mode and time division multiple access mode, and further, wherein said transmitters are structured and configured to emit radio frequency pulses operating with ultra-wide band wireless technology and said receivers are structured and configured to receive radio frequency pulses.

51. The system of claim 50, wherein said transceivers are structured and configured to transfer data to other said transceivers isochronously.

52. The system of claim 51, wherein each said slave transceiver further comprises a local clock therein, said master transceiver further comprising a master clock therein, each said local clock synchronized with said master clock.

53. An ultra-wideband wireless communication network system comprising at least three transceivers, each said transceiver having a transmitter and a receiver, one of said transceivers being structured and configured as a master device, and master device structured and configured to manage data transmission between said transceivers, wherein each said transceiver further comprises a framing controller, said framing controller having means for generating and maintaining time frame information for said network system, said system further comprising a Medium Access Control hardware interface comprising a multiplexer/demultiplexer unit and a plurality of slot allocation units, said multiplexer/demultiplexer unit operatively coupled to said plurality of slot allocation units.

54. The system of claim 53, wherein said transmitters are structured and configured to emit radio frequency pulses operating with baseband wireless technology and said receivers are structured and configured to receive radio frequency pulses.

55. The system of claim 54, wherein said transceivers are structured and configured to transfer data to other said transceivers isochronously.

56. The system of claim 55, wherein each said slave transceiver further comprises a local clock therein, said master transceiver further comprising a master clock therein, each said local clock synchronized with said master clock.

57. The system of claim 53, wherein said transmitters are structured and configured to emit radio frequency pulses operating with ultra-wide band wireless technology and said receivers are structured and configured to receive radio frequency pulses.

58. The system of claim 57, wherein said transceivers are structured and configured to transfer data to other said transceivers isochronously.

59. The system of claim 58, wherein each said slave transceiver further comprises a local clock therein, said master transceiver further comprising a master clock therein, each said local clock synchronized with said master clock.

60. An ultra-wideband wireless communication network system comprising at least three transceivers, with each transceiver including a Medium Access Control protocol having a time division multiple access frame definition, each said transceiver having a transmitter and a receiver, one of said transceivers being structured and configured as a master device, and master device structured and configured to manage data transmission between said transceivers, wherein each said transceiver further comprises a framing controller, said framing controller having means for generating and maintaining time frame information for said network system, wherein said transmitters are structured and configured to emit radio frequency pulses operating with baseband wireless technology and said receivers are structured and configured to receive radio frequency pulses, and further wherein said transceivers are structured and configured to transfer data to other said transceivers isochronously.

61. The system of claim 60, wherein each said slave transceiver further comprises a local clock therein, said master transceiver further comprising a master clock therein, each said local clock synchronized with said master clock.

62. An ultra-wideband wireless communication network system comprising at least three transceivers, with each transceiver including a Medium Access Control protocol having a time division multiple access frame definition, each said transceiver having a transmitter and a receiver, one of said transceivers being structured and configured as a master device, said master device structured and configured to manage direct data transmission between said at least three transceivers, wherein each transceiver further comprises a framing controller, said framing controller having means for generating and maintaining time frame information for said network system, wherein said transmitters are structured and configured to emit radio frequency pulses operating with ultra-wide band technology and said receivers are structured and configured to receive said radio pulses.

63. The system of claim 62, wherein said transceivers are structured and configured to transfer data to other said transceivers isochronously.

64. The system of claim 63, wherein each said slave transceiver further comprises a local clock therein, said master transceiver further comprising a master clock therein, each said local clock synchronized with said master clock.

65. An ultra-wideband wireless communication network system comprising at least three transceivers, with each transceiver including a Medium Access Control protocol having a time division multiple access frame definition, each said transceiver having a transmitter and a receiver, one of said transceivers being structured and configured as a master device, said master device structured and configured to manage direct data transmission between said at least three transceivers, wherein each transceiver further comprises a framing controller, said framing controller having means for generating and maintaining time frame information for said network system, wherein said transceivers are structured and configured to transfer data to other said transceivers isochronously.

66. The system of claim 65, wherein each said slave transceiver further comprises a local clock therein, said master transceiver further comprising a master clock therein, each said local clock synchronized with said master clock.

67. An ultra-wideband wireless communication network system comprising at least three transceivers, each said transceiver having a transmitter and a receiver, one of said transceivers being structured and configured as a master device, and said master device structured and configured to manage data transmission between said transceivers, wherein other transceivers of said at least three transceivers being structured and configured as slave transceivers, each of said slave transceivers further comprises a local clock therein, said master transceiver further comprising a master clock therein, each said local clock synchronized to said master clock, wherein said transceivers operate according to a Medium Access Control protocol structured and configured to operate in aloha mode and time division multiple access mode, said system further comprising a frame definition having a master slot, a command slot, a plurality of data slots, said master device having a master sync code, a protocol operating in slotted aloha mode and time division multiple access mode, said master device managing said protocol and said data slots in said protocol, wherein said transmitters are structured and configured to emit radio frequency pulses operating with baseband wireless technology and said receivers structured and configured to receive radio frequency pulses, and further wherein said transceivers are structured and configured to transfer data to other transceivers isochronously.

68. An ultra-wideband wireless communication network system comprising at least three transceivers, each said transceiver having a transmitter and a receiver, one of said transceivers being structured and configured as a master device, and master device structured and configured to manage data transmission between said transceivers, wherein each said stave transceiver further comprises a local clock therein, said master transceiver further comprising a master clock therein, each said local clock synchronized with said master clock, wherein said transceivers operate according to a Medium Access Control protocol having a time division multiple access frame definition, said protocol structured and configured to operate in aloha mode and time division multiple access mode, said system further comprising a frame definition having a master slot, a command slot, and a plurality of data slots, said master having a master sync code, a protocol operating in slotted aloha mode and time division multiple access mode, said master device managing said protocol and said data slots in said protocol, and further, wherein said transmitters are structured and configured to emit radio frequency pulses operating with ultra-wide band wireless technology and said receivers are structured and configured to receive radio frequency pulses.

69. The system of claim 68, wherein said transceivers are structured and configured to transfer data to other said transceivers isochronously.

70. An ultra-wideband wireless communication network system comprising at least three transceivers, each said transceiver having a transmitter and a receiver, one of said transceivers being structured and configured as a master device, and master device structured and configured to manage data transmission between said transceivers, wherein each said slave transceiver further comprises a local clock therein, said master transceiver further comprising a master clock therein, each said local clock synchronized with said master clock, said system further comprising a frame definition having a master slot, a command slot, and a plurality of data slots, said master having a master sync code, a protocol operating in slotted aloha mode and time division multiple access mode, said master device managing said protocol and said data slots in said protocol, wherein said transmitters are structured and configured to emit radio frequency pulses operating with baseband wireless technology and said receivers are structured and configured to receive radio frequency pulses, and further, wherein said transceivers are structured and configured to transfer data to other said transceivers isochronously.

71. An ultra-wideband wireless communication network system comprising at least three transceivers, each said transceiver having a transmitter and a receiver, one of said transceivers being structured and configured as a master device, and master device structured and configured to manage data transmission between said transceivers, wherein each said slave transceiver further comprises a local clock therein, said master transceiver further comprising a master clock therein, each said local clock synchronized with said master clock, said system further comprising a frame definition having a master slot, a command slot, and a plurality of data slots, said master having a master sync code, a protocol operating in slotted aloha mode and time division multiple access mode, said master device managing said protocol and said data slots in said protocol, wherein said transmitters are structured and configured to emit radio frequency pulses operating with ultra-wide band wireless technology and said receivers are structured and configured to receive radio frequency pulses.

72. The system of claim 71, wherein said transceivers are structured and configured to transfer data to other said transceivers isochronously.

73. An ultra-wideband wireless communication network system comprising at least three transceivers, each said transceiver having a transmitter and a receiver, one of said transceivers being structured and configured as a master device, said master device structured and configured to manage direct data transmission between said at least three transceivers, wherein each transceiver further comprises a framing controller, said framing controller having means for generating and maintaining time frame information for said network system, wherein said transmitters are structured and configured to emit radio frequency pulses operating with ultra-wide band technology and said receivers are structured and configured to receive said radio pulses, and wherein said transceivers are structured and configured to transfer data to other said transceivers isochronously, and wherein each said slave transceiver further comprises a local clock therein, said master transceiver further comprising a master clock therein, each said local clock synchronized with said master clock.

74. An ultra-wideband wireless communication network system comprising at least three transceivers, each said transceiver having a transmitter and a receiver, one of said transceivers being structured and configured as a master device, and master device structured and configured to manage data transmission between said transceivers, wherein each said transceiver further comprises a framing controller, said framing controller having means for generating and maintaining time frame information for said network system, wherein said transmitters are structured and configured to emit radio frequency pulses operating with baseband wireless technology and said receivers are structured and configured to receive radio frequency pulses, and further wherein said transceivers are structured and configured to transfer data to other said transceivers isochronously, and wherein each said slave transceiver further comprises a local clock therein, said master transceiver further comprising a master clock therein, each said local clock synchronized with said master clock.

75. An ultra-wideband wireless communication network system comprising at least three transceivers, each said transceiver having a transmitter and a receiver, one of said transceivers being structured and configured as a master device, said master device structured and configured to manage direct data transmission between said at least three transceivers, wherein each transceiver further comprises a framing controller, said framing controller having means for generating and maintaining time frame information for said network system, wherein said transmitters are structured and configured to emit radio frequency pulses operating with ultra-wide band technology and said receivers are structured and configured to receive said radio pulses, and wherein said transceivers are structured and configured to transfer data to other said transceivers isochronously, and wherein each said slave transceiver further comprises a local clock therein, said master transceiver further comprising a master clock therein, each said local clock synchronized with said master clock.

76. An ultra-wideband wireless communication network system comprising at least three transceivers, each said transceiver having a transmitter and a receiver, one of said transceivers being structured and configured as a master device, said master device structured and configured to manage direct data transmission between said at least three transceivers, wherein each transceiver further comprises a framing controller, said framing controller having means for generating and maintaining time frame information for said network system, wherein said transceivers are structured and configured to transfer data to other said transceivers isochronously, and wherein each said slave transceiver further comprises a local clock therein, said master transceiver further comprising a master clock therein, each said local clock synchronized with said master clock.

* * * * *

UNITED STATES PATENT AND TRADEMARK OFFICE
CERTIFICATE OF CORRECTION

| | |
|---|---|
| PATENT NO. | : 7,023,833 B1 |
| APPLICATION NO. | : 09/393126 |
| DATED | : April 4, 2006 |
| INVENTOR(S) | : Aiello et al. |

It is certified that error appears in the above-identified patent and that said Letters Patent is hereby corrected as shown below:

On the Title Page, item (75), under "Inventors", in Column 1, Line 6, delete "Sparell," and insert -- Sparrell, --, therefor.

On the Title Page, item (51), under "Int. Cl.", in Column 1, Line 1, delete "A04Q" and insert -- H04Q --, therefor.

On the Title Page, item (56), under "U.S. PATENT DOCUMENTS", in Column 1, Line 3, delete "328/38" and insert -- 325/38 --, therefor.

On the Title Page, item (74), under "Attorney, agent, or Firm", in Column 2, Line 1, delete "Inc;" and insert -- Inc.; --, therefor.

On Page 2, item (56), under "U.S. PATENT DOCUMENTS", in Column 2, Line 12, delete "Nitta et al." and insert -- Chuah --, therefor.

On Page 2, item (56), under "U.S. PATENT DOCUMENTS", in Column 2, Line 42, delete "B1" and insert -- B2 --, therefor.

On Page 2, item (56), under "U.S. PATENT DOCUMENTS", in Column 2, Line 54, delete "B1" and insert -- B2 --, therefor.

On Page 3, item (56), under "OTHER PUBLICATIONS", in Column 1, Line 7, delete "Bandwith,"" and insert -- Bandwidth," --, therefor.

In Column 1, Lines 47-52, delete "Media streams..........reference." and insert the same at Line 48, as a new paragraph.

In Column 2, Line 9, delete "though" and insert -- through --, therefor.

Signed and Sealed this
Third Day of July, 2012

David J. Kappos
*Director of the United States Patent and Trademark Office*

CERTIFICATE OF CORRECTION (continued)
U.S. Pat. No. 7,023,833 B1

In Column 2, Line 62, delete "(CP)," and insert -- (CPs), --, therefor.

In Column 3, Line 41, delete "et." and insert -- et --, therefor.

In Column 3, Line 45, delete "et." and insert -- et --, therefor.

In Column 4, Line 25, delete "means," and insert -- means --, therefor.

In Column 7, Lines 7-8, delete "DRAWING FIGURES" and insert -- DRAWINGS/FIGURES --, therefor.

In Column 17, Line 52, delete "Link Layer" and insert -- Link Control --, therefor.

In Column 19, Line 8, in Claim 1, delete "aloha" and insert -- ALOHA --, therefor at each occurrence throughout the claims.

In Column 19, Line 40, in Claim 9, delete "transceivers" and insert -- transceivers, --, therefor.

In Column 25, Line 12, in Claim 68, delete "stave" and insert -- slave --, therefor.